Aug. 2, 1927.
G. J. ABBOTT
1,637,402
POWER TRANSMISSION PULLEY
Filed Oct. 9, 1926
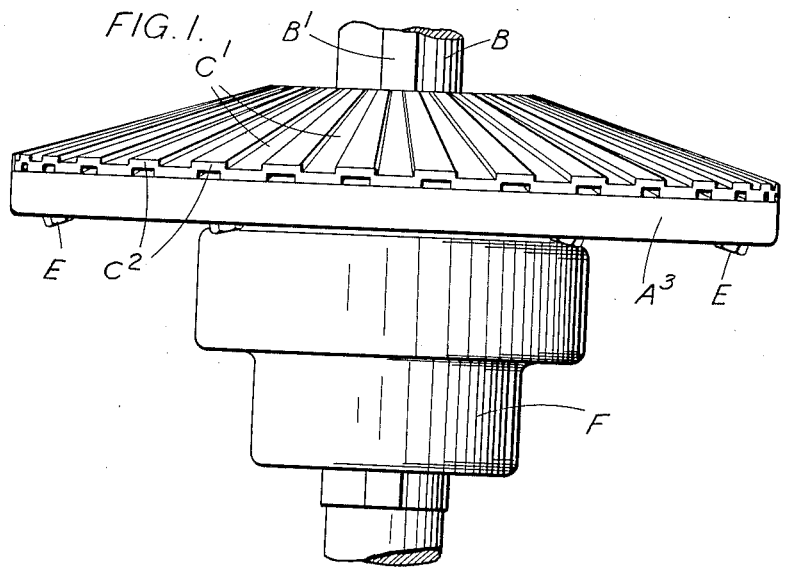
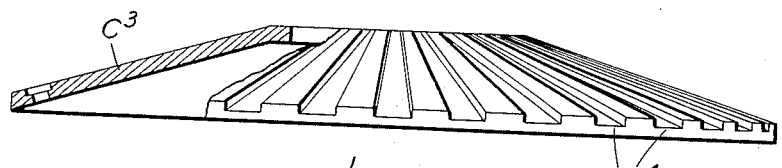
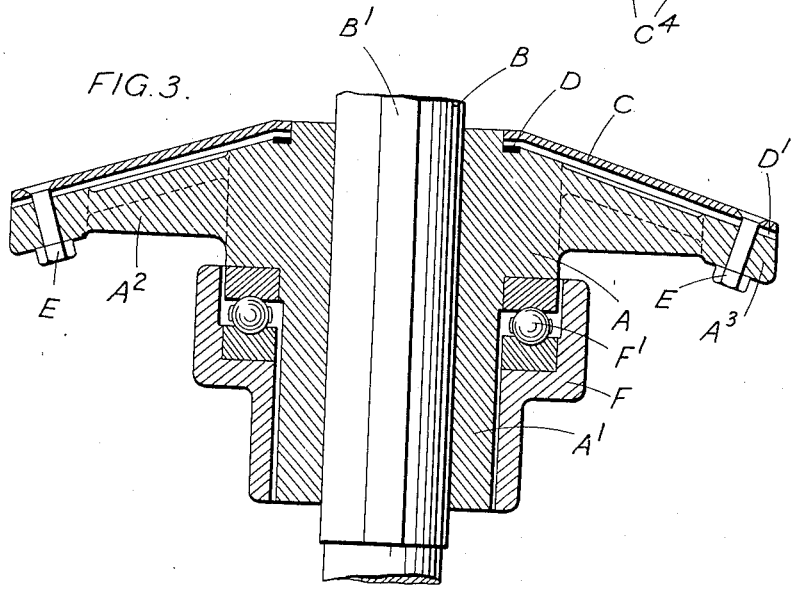
INVENTOR
G. J. Abbott
BY Watson, Coit, Morse & Grindle
ATTYS.

Patented Aug. 2, 1927.

1,637,402

UNITED STATES PATENT OFFICE.

GEOFFREY JOSEPH ABBOTT, OF LONDON, ENGLAND.

POWER-TRANSMISSION PULLEY.

Application filed October 9, 1926, Serial No. 140,637, and in Great Britain November 11, 1925.

This invention relates to power transmission pulleys of the kind having oppositely inclined flanges such as are usually employed in variable speed gears, the distance between the inclined flanges being adjusted to vary the effective diameter at which the flexible driving member engages the pulley.

When such pulleys are intended for use with driving belts or chains having a series of laterally projecting compound teeth each built up from a variable number of metal plates adapted to slide across the length of the chain, depressions and projections are formed in the pulley flanges with which these driving teeth engage. Hitherto the manufacture of such pulley flanges has presented considerable difficulty, since the grooves must be very accurately cut, the ribs on one flange must exactly register with the grooves on the opposite flange, and both flanges require case hardening after being cut and this hardening causes distortion and thus leads to inefficient working of the gear, and the object of this invention is to provide a pulley of this type which will work accurately when completed and which can be easily and cheaply made.

According to this invention each pulley flange comprises a relatively thin pressing or stamping having alternate ribs and depressions to engage the driving teeth of the chain or belt and a comparatively heavy reinforcing backing or support to impart the necessary lateral stability to the pressing, this backing member being provided with a boss or its equivalent to receive the shaft on which the pulley is mounted.

Each of these members can therefore be formed from the material best suited to the task it has to perform, so that the reinforcing backing or support may for instance be of cast iron and a steel pressing, which can if desired be subsequently hardened, may be used for the working face of the pulley, the grooves being either pressed up or machined on the surface. The two component members of each pulley flange are preferably connected together as for example by means of rivets, bolts or screws, or, if desired, they may be held together against relative rotary motion in a frictional manner by the lateral pressure exerted by the ends of the compound driving teeth.

Two constructional forms of the invention are illustrated by way of example in the accompanying drawings, in which Figure 1 is a side elevtion of one construction of pulley flange according to this invention in which the pressing or stamping and the supporting backing are rigidly connected together.

Figure 2 shows a modified form of pulley face having teeth machined on the surface of the pressed disc, and Figure 3 is a longitudinal section through the pulley flange shown in Figure 1.

In the construction illustrated in Figures 1 and 3 the pulley flange comprises a cast iron or like backing or support A having a central boss $A^1$ bored to receive a pulley shaft B and connected by a suitable number of arms, spokes or webs $A^2$ to a relatively heavy rim $A^3$. The actal working face of the pulley i. e. that with which the driving teeth engage, is in the form of a relatively thin steel or like pressing or stamping C having the necessary radial grooves $C^1$ and projections $C^2$ on its face, the stamping being dished or inclined as a whole to the required extent as shown so as to give the necessary inclination. Suitable seatings are formed for the underside of the pressing or stamping C on the inner face of the casting A. Thus, an annular bearing surface or seating D is conveniently formed by turning the face of the casting A around the boss $A^1$ while a similar annular seating is formed at $D^1$ on the inner face of the rim $A^3$, so that the casting A and pressing or stamping C can be readily and rigidly connected together by means of a series of bolts as shown at E. Instead of bolts, rivets or screws may in some cases be employed to connect the pressing or stamping and the casting together. In the alternative construction shown in Figure 2, instead of the face part having the grooves and ribs pressed as in the construction shown in Figures 1 and 3, a pressed steel dish or saucer $C^3$ is employed having the grooves machined on its outer face. This is secured by bolts, screws or rivets as in the former construction.

The pulley flange formed in either of the above ways together with another similar flange to constitute a complete pulley are conveniently mounted on a common shaft having a feather $B^1$ or like means which, while permitting relative movement of one or both flanges in the axial direction for the purpose of varying the effective diameter of the pulley, prevents their relative rotary movement and thus ensures the grooves $C^1$ on one pulley flange accurately registering with the ribs or projections $C^2$ on the other flange. Some known means are provided for varying the distance between the two flanges so as to vary the effective diameter of the pulley, such means comprising for example a member acting on one or each pulley flange through a collar F and thrust bearing $F^1$.

What I claim as my invention and desire to secure by Letters Patent is:—

1. An expanding pulley comprising in combination a pair of relatively thin dished pressings having alternate radially extending grooves and depressions, a pair of comparatively rigid reinforcing backings for said pressings and means for connecting each pressing to its respective backing member.

2. An expanding pulley comprising in combination a pair of relatively thin conical members having alternate radially extending grooves and depressions on their outer faces, formed from steel pressings which are subsequently hardened, a supporting backing of cast metal for each of said pressed steel members and a positive connection between each pressing and its backing.

3. As a new article of manufacture for use in an expanding pulley a relatively thin dished steel pressing having alternate radially extending grooves and depressions on its outer surface.

In testimony whereof I have signed my name to this specification.

GEOFFREY JOSEPH ABBOTT.